US011167209B2

United States Patent
Lu et al.

(10) Patent No.: US 11,167,209 B2
(45) Date of Patent: Nov. 9, 2021

(54) GAME CONTROLLER

(71) Applicants: DEXIN ELECTRONIC LTD., Guangdong (CN); DEXIN CORPORATION, New Taipei (TW)

(72) Inventors: Ho-Lung Lu, New Taipei (TW); Chin-Lung Lin, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/015,082

(22) Filed: Sep. 9, 2020

(65) Prior Publication Data
US 2021/0299553 A1 Sep. 30, 2021

(30) Foreign Application Priority Data
Mar. 25, 2020 (TW) ................ 109109961

(51) Int. Cl.
*A63F 13/24* (2014.01)
*A63F 13/98* (2014.01)
*A63F 13/92* (2014.01)
*G06F 1/16* (2006.01)

(52) U.S. Cl.
CPC .............. *A63F 13/24* (2014.09); *A63F 13/92* (2014.09); *A63F 13/98* (2014.09); *G06F 1/1632* (2013.01); *A63F 2300/1025* (2013.01); *A63F 2300/1043* (2013.01); *A63F 2300/301* (2013.01)

(58) Field of Classification Search
None
See application file for complete search history.

(56) References Cited

U.S. PATENT DOCUMENTS

| 8,075,399 | B2* | 12/2011 | Chang | .............. A63F 13/08 463/35 |
| 9,914,060 | B1* | 3/2018 | Corigliano | ............ G06F 1/1632 |
| 10,039,976 | B2* | 8/2018 | Kim | .............. H04M 1/72427 |
| 10,868,436 | B1* | 12/2020 | Chen | .............. A63F 13/23 |
| 2002/0155890 | A1* | 10/2002 | Ha | .............. A63F 13/06 463/36 |
| 2003/0186746 | A1* | 10/2003 | Chuang | .............. A63F 13/235 463/42 |

(Continued)

OTHER PUBLICATIONS

Notebook Italia, Razer Kishi and Razer Junglecat mobile gaming controllers, Jan. 30, 2020 , https://www.youtube.com/watch?v=DvCNh-ylGXc , p. 1 (Year: 2020).*

(Continued)

*Primary Examiner* — Tramar Harper
(74) *Attorney, Agent, or Firm* — Li & Cai Intellectual Property Office

(57) ABSTRACT

A game controller including a first elastic cushion and a first handle is provided. The first handle includes a first port, a first operation interface, and a first affixing part. The first operation interface is electrically connected to the first port, the first affixing part is recessed in a side of the first handle, and the first port is disposed on the first affixing part. The first elastic cushion is disposed on the first affixing part, and the first elastic cushion is sleeved on a mobile device, so that the mobile device is affixed on the first affixing part of the first handle through the first elastic cushion.

8 Claims, 10 Drawing Sheets

(56) References Cited

U.S. PATENT DOCUMENTS

| | | | | |
|---|---|---|---|---|
| 2004/0213405 A1* | 10/2004 | Wilcox | ............. | H04M 1/04 379/455 |
| 2006/0252537 A1* | 11/2006 | Wu | ............. | A63F 13/02 463/36 |
| 2012/0037771 A1* | 2/2012 | Kitchen | ............. | G06F 1/1632 248/223.41 |
| 2012/0271967 A1* | 10/2012 | Hirschman | ............. | A63F 13/24 710/8 |
| 2013/0058659 A1* | 3/2013 | Umezu | ............. | G06F 1/169 398/128 |
| 2013/0120258 A1* | 5/2013 | Maus | ............. | A63F 13/245 345/161 |
| 2013/0184077 A1* | 7/2013 | Galpern | ............. | A63F 13/92 463/37 |
| 2014/0228075 A1* | 8/2014 | Baschnagel | ............. | H04M 1/04 455/557 |
| 2014/0274394 A1* | 9/2014 | Willis | ............. | G06F 1/1656 463/37 |
| 2015/0031452 A1* | 1/2015 | Rundell | ............. | A63F 13/92 463/31 |
| 2015/0281422 A1* | 10/2015 | Kessler | ............. | H04M 11/007 455/557 |
| 2015/0335998 A1* | 11/2015 | Bala | ............. | A63F 13/22 463/37 |
| 2017/0056762 A1* | 3/2017 | Gafni | ............. | A63F 13/24 |
| 2017/0315626 A1* | 11/2017 | Townley | ............. | G06F 1/1632 |
| 2018/0250588 A1* | 9/2018 | Winick | ............. | A63F 13/25 |
| 2018/0345130 A1* | 12/2018 | Wells | ............. | A63F 13/92 |
| 2020/0078670 A1* | 3/2020 | Oh | ............. | A63F 13/98 |
| 2020/0155928 A1* | 5/2020 | Guo | ............. | A63F 13/24 |
| 2020/0324197 A1* | 10/2020 | Ho | ............. | A63F 13/213 |

OTHER PUBLICATIONS

Engadget, Razer Kishi hands-on at CES 2020, Jan. 7, 2020, https://www.youtube.com/watch?v=L7-UoRMvloQ , p. 1 (Year: 2020).*

Geekazine, Razer Kishi Adds the Game Controller You Want for Your Phone, Feb. 10, 2020, https://www.youtube.com/watch?v=uvT_4bm6SLQ , p. 1 (Year: 2020).*

* cited by examiner

GAME CONTROLLER

CROSS-REFERENCE TO RELATED PATENT APPLICATION

This application claims the benefit of priority to Taiwan Patent Application No. 109109961, filed on Mar. 25, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a detachable game controller designed for mobile devices, and the game controller can be operated by using two handles or only a single handle.

BACKGROUND OF THE DISCLOSURE

Game handles, also known as game controllers, are user input devices that are designed to enable interaction among users on computers, mobile devices, video game control panels, and applications that are executed on other platforms. For example, game controllers are devices that can allow gamers to control characters or objects in video games. There are many types of game controllers, and each type of game controller can include one or more user-actuable operation interfaces through which the gamers can provide input. For example, conventional game controllers that are designed to be hand-held (e.g., control sticks) can include one or more user-actuable buttons, triggers, and joysticks. Every one of the operation interfaces can be controlled by the gamers to generate various types of control signals that are used to interact with each other in video games and other applications.

However, the commercially available game controllers are not designed specifically for mobile devices, and are generally inconvenient to store and cannot be tightly engaged with different types of mobile devices and cellphones. Moreover, the conventional game controllers are unable to be assembled with mobile devices that already have protective cases or sleeves. The above mentioned inadequacies result in inconvenient and uncomfortable user experiences.

SUMMARY OF THE DISCLOSURE

In response to the above-referenced technical inadequacies, the present disclosure provides a game controller.

In one aspect, the present disclosure provides a game controller including a first elastic cushion and a first handle. The first handle includes a first port, a first operation interface, and a first affixing part.

More particularly, the first operation interface is electrically connected to the first port, the first affixing part is recessed in a side of the first handle, and the first port is disposed on the first affixing part. The first elastic cushion is disposed on the first affixing part, and the first elastic cushion is sleeved on a mobile device, so that the mobile device is affixed on the first affixing part of the first handle through the first elastic cushion.

In another aspect, the present disclosure provides a game controller including a first elastic cushion, a first handle, a second elastic cushion, and a second handle. The first handle includes a first port, a second port, a first affixing part, and a first operation interface. The second handle includes a third port and a second operation interface.

More particularly, the first operation interface is electrically connected to the first port, the first affixing part is recessed in a side of the first handle, and the first port is disposed on the first affixing part. The first elastic cushion is disposed on the first affixing part, and the first elastic cushion is sleeved on a mobile device, so that the mobile device is affixed on the first affixing part of the first handle through the first elastic cushion. The first port has a first connecting wire and a first plug connector, the second port is electrically connected to the first port, the first connecting wire is connected to the first plug connector, the second operation interface is electrically connected to the third port, the second affixing part is recessed in a side of the second handle, and the third port is disposed on the second affixing part. The second elastic cushion is disposed on the second affixing part, and the second elastic cushion is sleeved on the mobile device, so that the mobile device is affixed on the second affixing part of the second handle through the second elastic cushion. The third port has a second connecting wire and a second plug connector, the third port of the second handle is connected to the second socket connector of the second port of the first handle through the second connecting wire and the second plug connector.

In yet another aspect, the present disclosure provides a game controller including a first elastic cushion, a first handle, a first operation interface, a second elastic cushion, and a second handle. The first handle includes a first port, a second port, a first affixing part, and a first operation interface. The first operation interface is electrically connected to the first port. The second handle includes a third port and a second battery module.

More particularly, the first operation interface is electrically connected to the first port, the first affixing part is recessed in a side of the first handle, and the first port is disposed on the first affixing part. The first elastic cushion is disposed on the first affixing part, and the first elastic cushion is sleeved on a mobile device, so that the mobile device is affixed on the first affixing part of the first handle through the first elastic cushion. The first port has a first connecting wire and a first plug connector, the second port is electrically connected to the first port, the first connecting wire is connected to the first plug connector, the second battery module is electrically connected to the third port, the second affixing part is recessed in a side of the second handle, and the third port is disposed on the second affixing part. The second elastic cushion is disposed on the second affixing part, and the second elastic cushion is sleeved on the mobile device, so that the mobile device is affixed on the second affixing part of the second handle through the second elastic cushion. The third port has a second connecting wire and a second plug connector, the second connecting wire is electrically connected to the second plug connector, and the third port of the second handle is connected to the second socket connector of the second port of the first handle through the second connecting wire and the second plug connector.

Therefore, the game controller provided by the present disclosure includes at least one handle, and the game controller has a port, a connecting wire, and a plug connector on the side. The connecting wire can be lengthened or shortened so as to be adjusted to suit a position of a transmission port of the mobile device, and the connecting wire can also be stored into an accommodating space of the handle. When the game controller includes two handles, each of the handles can have a socket connector that enables either one of the handles to be a main device and be connected to mobile devices. The game controller can include two handles, and a port of at least one of the handles has a socket connector that is connected to a plug connector of the port of the other handle, so that a complete game controller is assembled. The mobile device can be assembled with a single handle or both of the handles of the game controller, so as to form a complete game controller, thus significantly enhancing the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
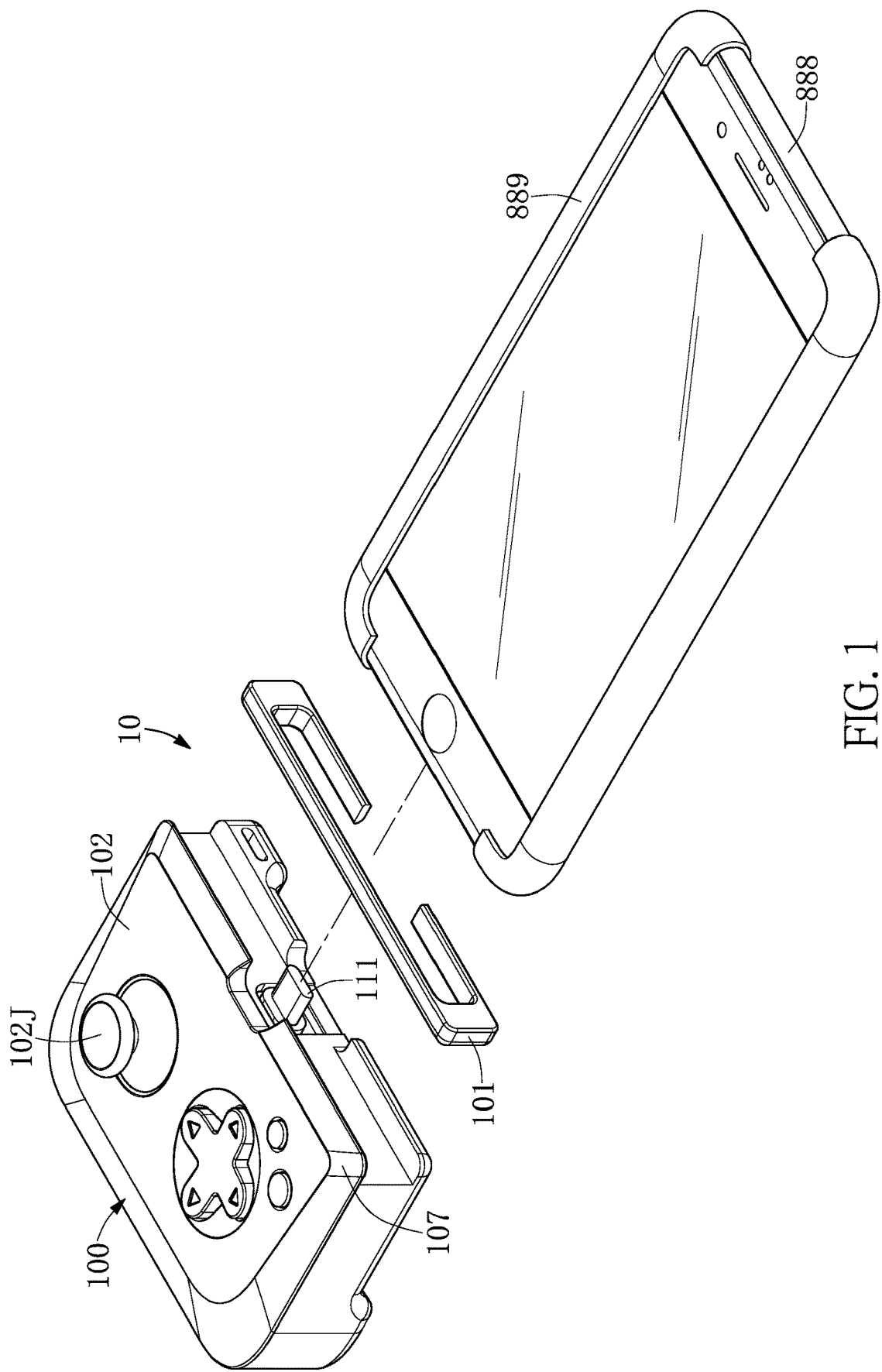
FIG. 1 is an exploded view of the game controller having a single handle that cooperates with a mobile device in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, an exploded view of the game controller having a single handle that cooperates with a mobile device in one embodiment of the present disclosure is provided. As shown in FIG. 1, a game controller 10 includes a first elastic cushion 101 and a first handle 100. The first handle 100 includes a first port 111, a first operation interface 102, and a first affixing part 107.

More particularly, the first operation interface 102 is electrically connected to the first port 111, the first affixing part 107 is recessed in a side of the first handle 100, and the first port 111 is disposed on the first affixing part 107. The first elastic cushion 101 is disposed on the first affixing part 107, and the first elastic cushion 101 is sleeved on a mobile device 888, so that the mobile device 888 is affixed on the first affixing part 107 of the first handle 100 through the first elastic cushion 101. The first elastic cushion 101 is composed of an elastic body. In one example, the first elastic cushion 101 has a C-shaped opening that is used to sleeve on the mobile device 888. In other examples, the first elastic cushion 101 can also be of a ring shape or other shapes, and the present disclosure is not limited thereto.

In this embodiment, a protective case 889, which has a material of plastic or metal, can be disposed on the mobile device 888. In one example, the mobile device 888 can still be affixed on the first affixing part 107 of the first handle 100 through the first elastic cushion 101, even when no protective case is disposed on the mobile device 888.

Figure 2:
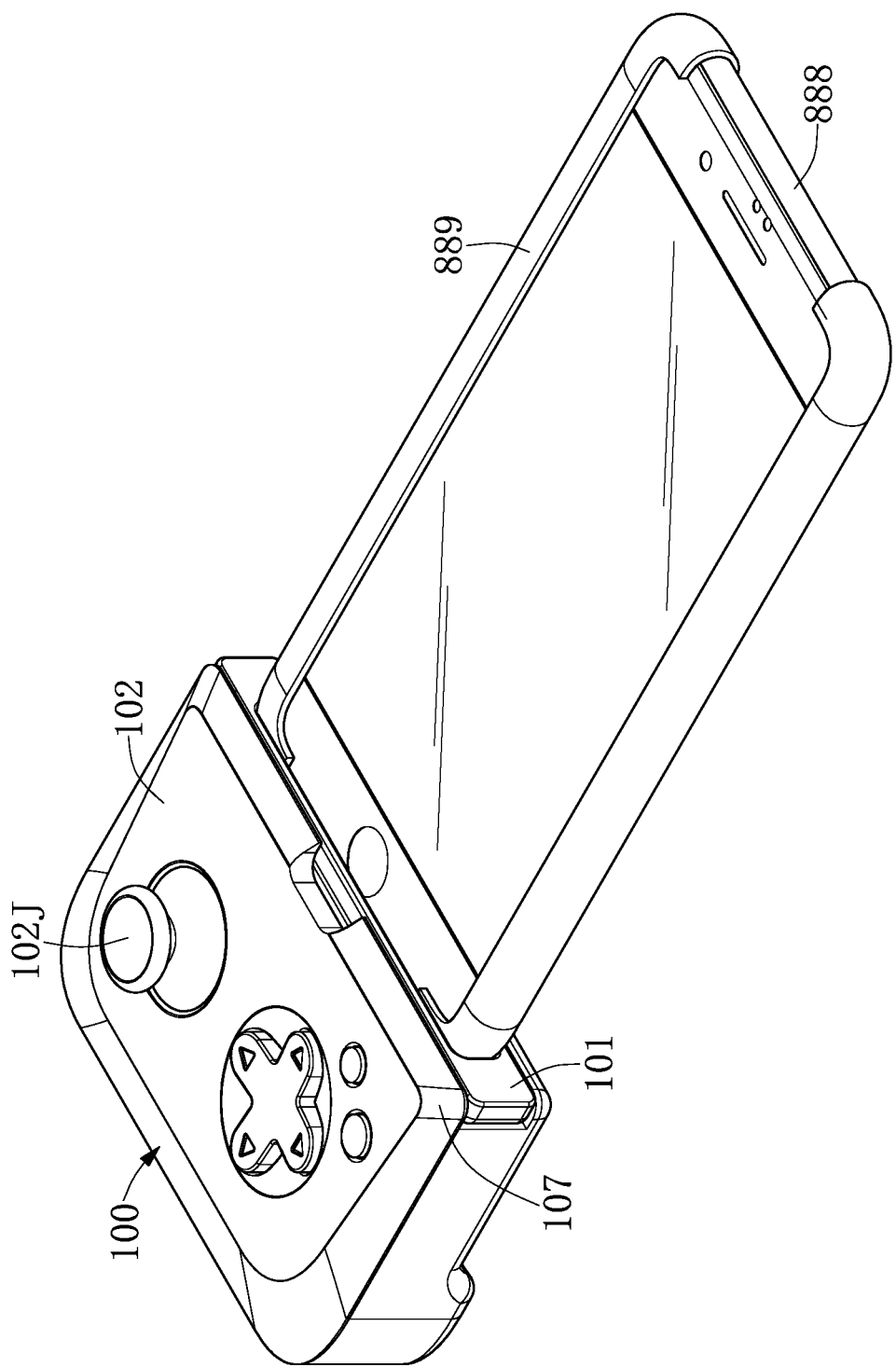
FIG. 2 is a schematic view of the game controller having a single handle and an elastic cushion that is sleeved on a mobile device in one embodiment of the present disclosure.

Reference is made to FIG. 1 and FIG. 2. FIG. 2 is a schematic view of the game controller having a single handle and an elastic cushion that is sleeved on a mobile device in one embodiment of the present disclosure. The first elastic cushion 101 is sleeved on the side of the mobile device 888, so that the mobile device 888 is affixed on the first affixing part 107 of the first handle 100 through the first elastic cushion 101.

Figure 3:
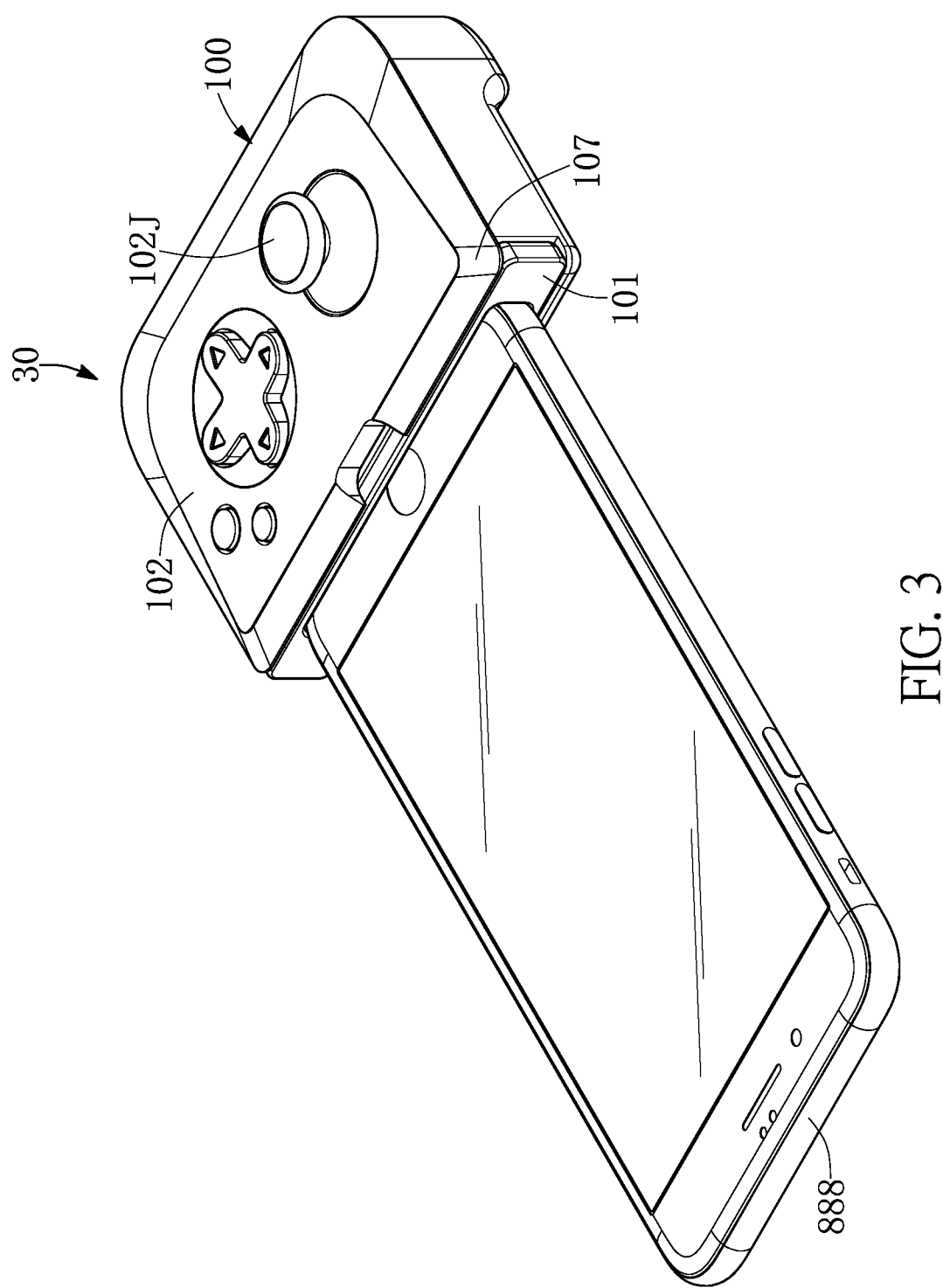
FIG. 3 is a schematic view of the game controller having a single handle that is assembled with a mobile device in one embodiment of the present disclosure.

Referring to FIG. 3, a schematic view of the game controller having a single handle that is assembled with a mobile device in one embodiment of the present disclosure is provided. As shown in FIG. 3, a game controller 30 includes the first elastic cushion 101 and the first handle 100. The first handle 100 includes the first operation interface 102 and the first affixing part 107.

More particularly, the first operation interface 102 includes a joystick module 102J. In other examples, one or a combination of a joystick module, a button module, or a trigger can be disposed on the first operation interface 102, so as to increase the interactivity between the gamers and the mobile device 888. The first affixing part 107 is recessed in the side of the first handle 100. The first elastic cushion 101 is disposed on the first affixing part 107, and the first elastic cushion 101 is sleeved on the mobile device 888, so that the mobile device 888 can be affixed on the first affixing part 107 of the first handle 100 through the first elastic cushion 101.

The game controller 10 is able to communicate with the mobile device 888. The above mentioned communication can be achieved through Bluetooth, Wi-Fi, and a USB connecting wire, and the present disclosure is not limited thereto.

Preferably, the first affixing part 107 has a first recess and a second recess (not shown in the figures).

In this embodiment, no protective case is disposed on the mobile device 888.

Figure 4:
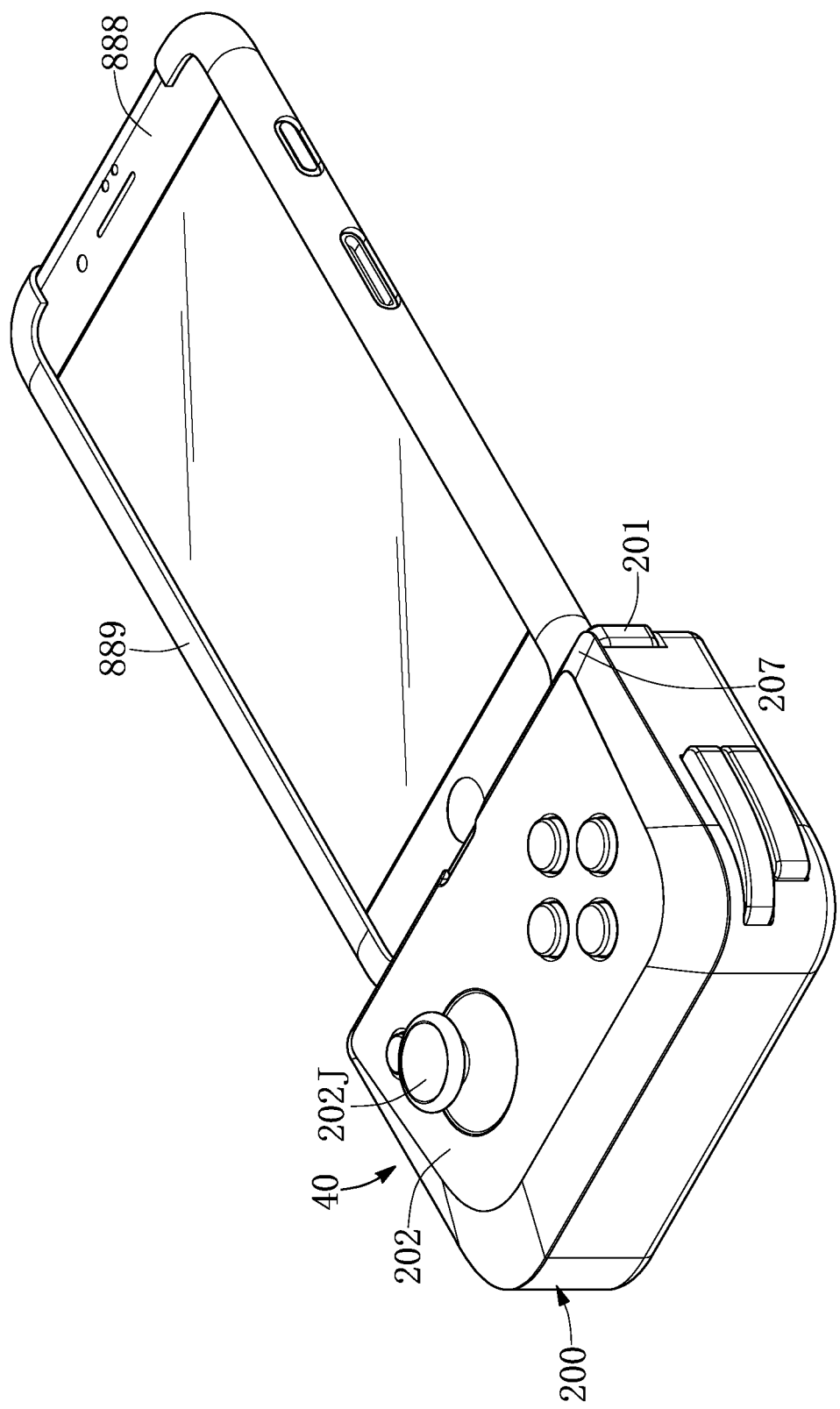
FIG. 4 is a schematic view of the game controller having a single handle that is assembled with a mobile device in one embodiment of the present disclosure.

Referring to FIG. 4, a schematic view of the game controller having a single handle that is assembled with a mobile device in one embodiment of the present disclosure is provided. Compared with the embodiment shown in FIG. 3, the game controller 40 shown in FIG. 4 is designed to adapt to the habits of both left-handed users and right-handed users. As shown in FIG. 4, the game controller 40 includes a second elastic cushion 201 and a second handle 200. The second handle 200 includes a second operation interface 202 and a second affixing part 207.

More particularly, the second operation interface 202 further includes a joystick module 202J, and the corresponding position of the joystick module 202J on the game controller 40 can improve the user experience of gamers with different dominant hands when operating the game controller 40. In other examples, one or a combination of a joystick module, a button module, and a trigger module can be disposed on the second operation interface 202, so as to increase the interactivity between the gamers and the mobile device 888.

The second affixing part 207 is recessed in a side of the second handle 200. The second affixing part 207 has a first recess and a second recess (not shown in the figures). The second elastic cushion 201 is disposed on the second affixing part 207, and the second elastic cushion 201 is sleeved on the mobile device 888, so that the mobile device 888 is affixed on the second affixing part 207 of the second handle 200. The game controller 40 can communicate wirelessly or wiredly with the mobile device 888.

In this embodiment, a protective case 889, which has a material of plastic or metal, can be disposed on the mobile device 888.

Figure 5:
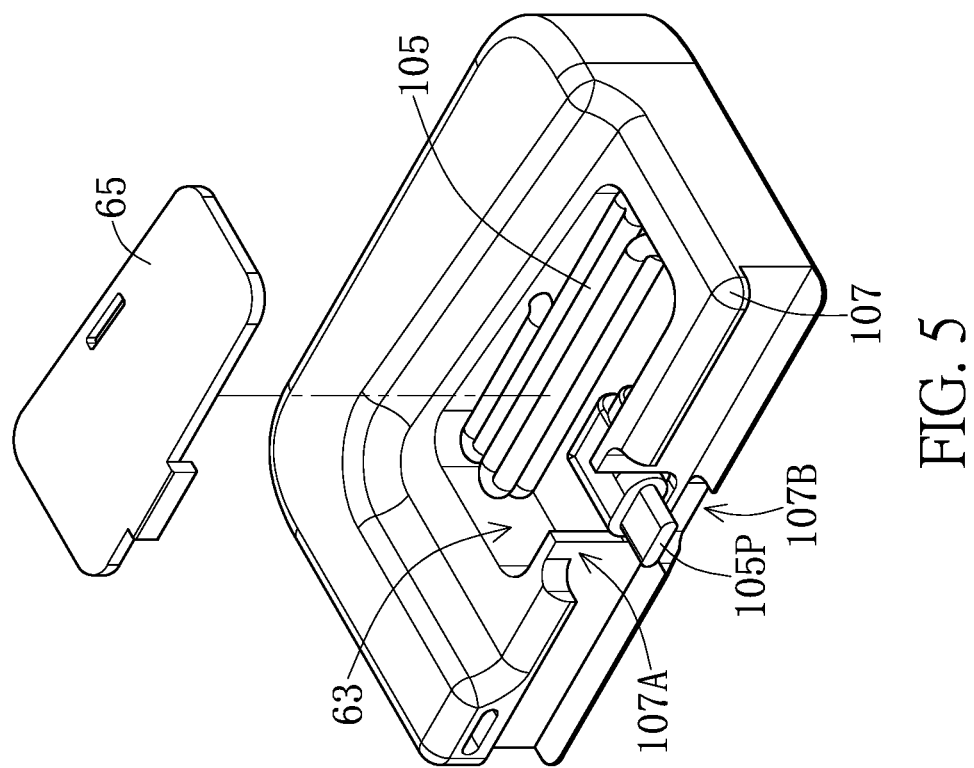
FIG. 5 is a schematic view showing the connecting wire of the game controller having a single handle being stored in the accommodating space in one embodiment of the present disclosure.

Reference is made to FIG. 1 and FIG. 5, in which FIG. 5 is a schematic view showing the connecting wire of the game controller having a single handle being stored in the accommodating space in one embodiment of the present disclosure. The first handle 100 has a first accommodating space 63 that accommodates a first connecting wire 105, and a first plug connector 105P is exposed out of the first accommodating space 63 and adjacent to the first affixing part 107.

The bottom of the first handle 100 can further include a cover 65, and the cover 65, the first accommodating space 63, the first affixing part 107, the first recess 107A, and the second recess 107B are all communicated with one another, such that the first connecting wire 105 can be connected to a port of another handle, and the first connecting wire 105 can also be shortened and stored into the first accommodating space 63 through elasticity. In other words, the cover 65 is provided to cover the first accommodating space 63, so that the first connecting wire 105 can be properly stored into the first accommodating space 63 when the cover 65 covers the first accommodating space 63.

Figure 6:
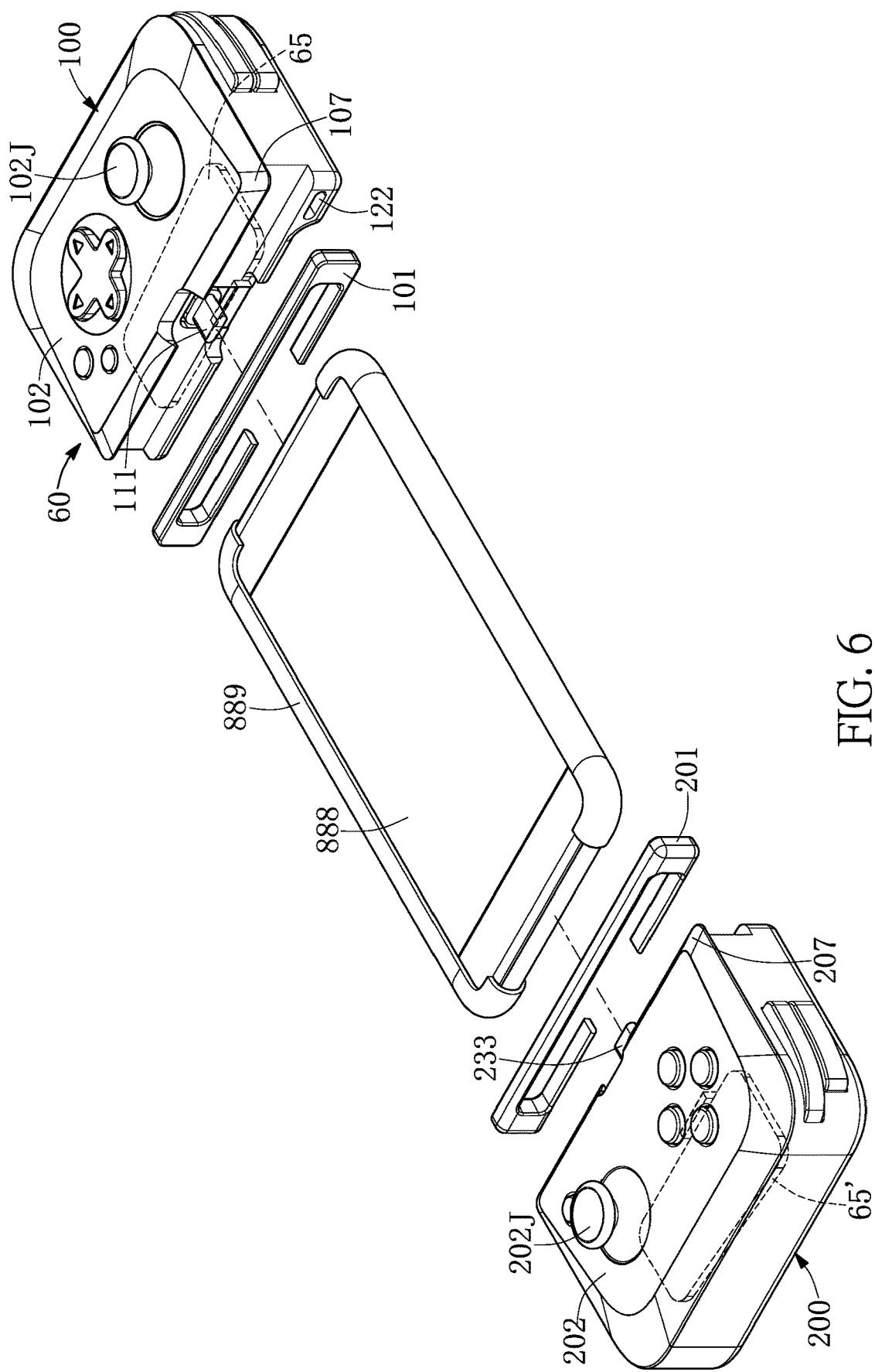
FIG. 6 is an exploded view of the game controller having two handles that cooperates with a mobile device in one embodiment of the present disclosure.

Referring to FIG. 6, an exploded view of the game controller having two handles that cooperates with a mobile device in one embodiment of the present disclosure is provided. As shown in FIG. 6, the game controller 60 includes the first elastic cushion 101, the first handle 100, the first operation interface 102, the second elastic cushion 201, and the second handle 200. The first handle 100 includes the first port 111, a second port 122, and the first affixing part 107. The second handle 200 includes a third port 233 and the second operation interface 202.

More particularly, the first operation interface 102 is electrically connected to the first port 111, the first affixing part 107 is recessed in the side of the first handle 100, and the first port 111 is disposed on the first affixing part 107.

More particularly, the first elastic cushion 101 is disposed on the first affixing part 107, and the first elastic cushion 101 is sleeved on the mobile device 888, so that the mobile device 888 can be affixed on the first affixing part 107 of the first handle 100 through the first elastic cushion 101.

More particularly, the first port 111 has a first connecting wire (not shown in the figures) and the first plug connector, the second port 122 is electrically connected to the first port 111, and the first connecting wire is electrically connected to the first plug connector.

More particularly, the second operation interface 202 is electrically connected to the third port 233, the second affixing part 207 is recessed in the side of the second handle 200, and the third port 233 is disposed on the second affixing part 207.

More particularly, the second elastic cushion 201 is disposed on the second affixing part 207, and the second elastic cushion 201 is sleeved on the mobile device 888, so that the mobile device 888 is affixed on the second affixing part 207 of the second handle 200 through the second elastic cushion 201.

More particularly, the third port 233 has a second connecting wire (not shown in the figures) and a second plug connector (not shown in the figures), and the second connecting wire is electrically connected to the second plug connector. The third port 233 of the second handle 200 can be connected to the second socket connector of the second port 122 of the first handle 100 through the second connecting wire and the second plug connector.

More particularly, the bottom of the first handle 100 can further include the cover 65, and the bottom of the second handle 200 can further include a cover 65'.

Figure 7:
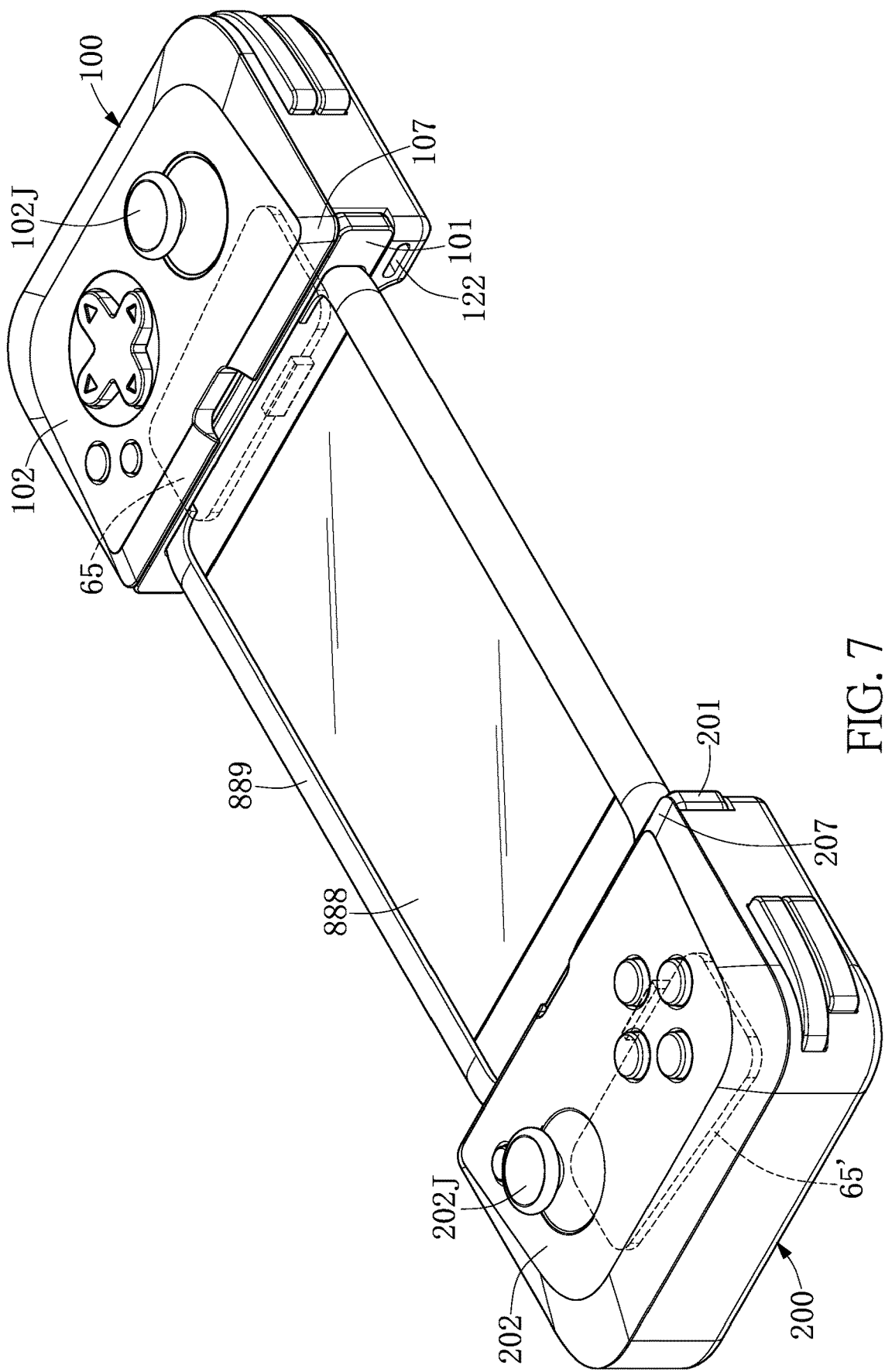
FIG. 7 is a schematic view of the game controller having two handles and the elastic cushion that is sleeved on a mobile device in one embodiment of the present disclosure.

Reference is made to FIG. 6 and FIG. 7. FIG. 7 is a schematic view of the game controller having two handles and the elastic cushion that is sleeved on a mobile device in one embodiment of the present disclosure. The first elastic cushion 101 and the second elastic cushion 201 are respectively sleeved on two sides of the mobile device 888, so that the two sides of the mobile device 888 are respectively affixed on the first affixing part 107 of the first handle 100 and the second affixing part 207 of the second handle 200.

Figure 8:
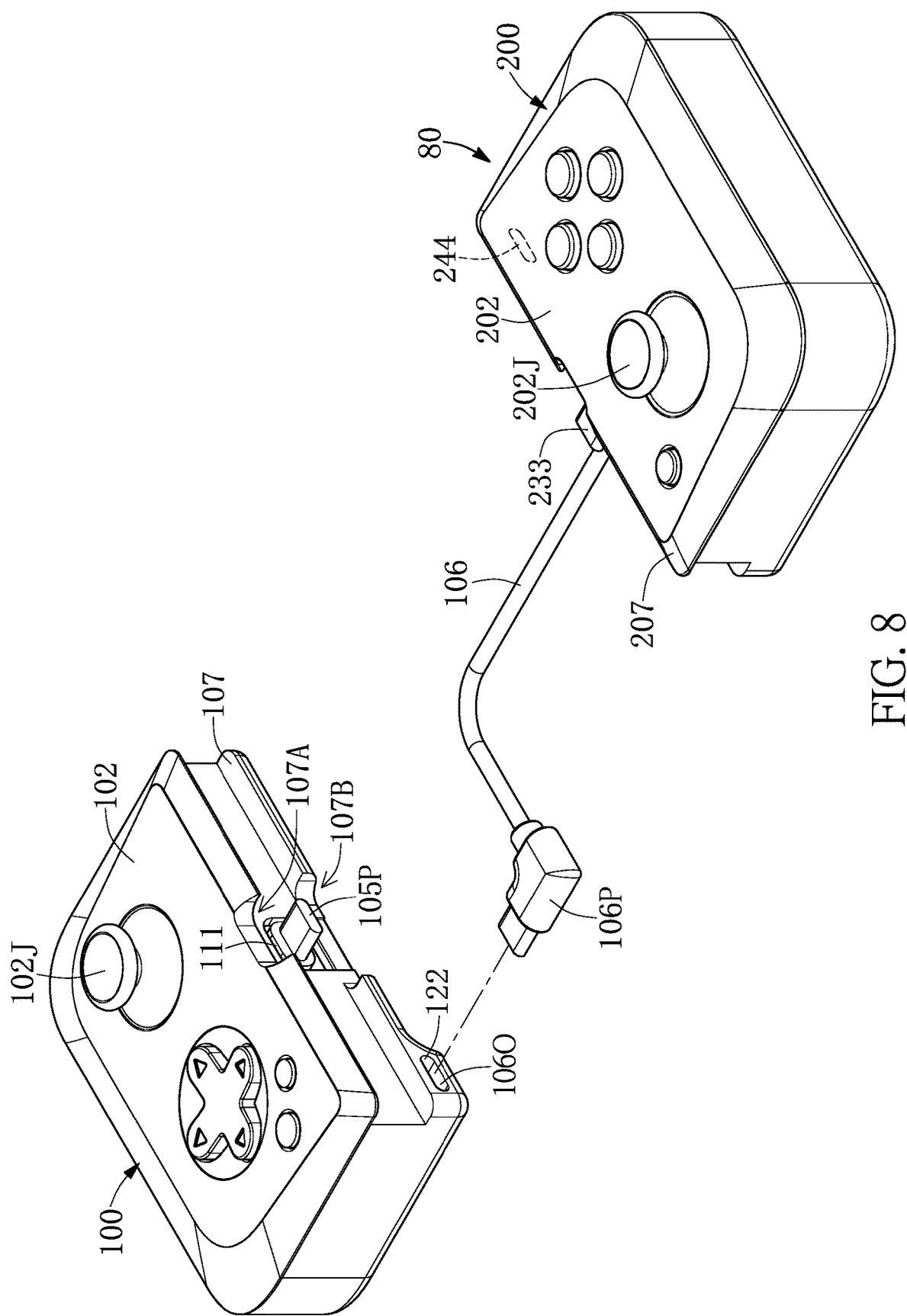
FIG. 8 is a schematic view of two types of single handles of the game controller that are assembled with each other respectively through a plug connector and a socket connector in one embodiment of the present disclosure.

Reference is made to FIG. 1 and FIG. 8. FIG. 8 is a schematic view of two types of single handles of the game controller that are assembled with each other respectively through a plug connector and a socket connector in one embodiment of the present disclosure. In one embodiment, compared with FIG. 1, the game controller 80 further includes the second handle 200 and the second operation interface 202. The second handle 200 includes the third port 233, a fourth port 244, and the second affixing part 207.

The second operation interface 202 is electrically connected to the third port 233, the second affixing part 207 is recessed in the side of the second handle 200, and the third port 233 is disposed on the second affixing part 207. The third port 233 has a second connecting wire 106 and a second plug connector 106P, the second connecting wire 106 is electrically connected to the second plug connector 106P, and the fourth port 244, having a fourth socket connector (not shown in the figures), is electrically connected to the third port 233.

In one embodiment, the first port 111, the second port 122, the third port 233, and the fourth port 244 are each one of a micro USB port, a lightning port, and a USB Type-C port.

In one embodiment, the second handle 200 has a second accommodating space (not shown in the figures) that accommodates the second connecting wire 106.

In one embodiment, the third port 233 of the second handle 200 is connected to a second socket connector 1060 of the second port 122 of the first handle 100 through the second connecting wire 106 and the second plug connector 106P.

Figure 9:
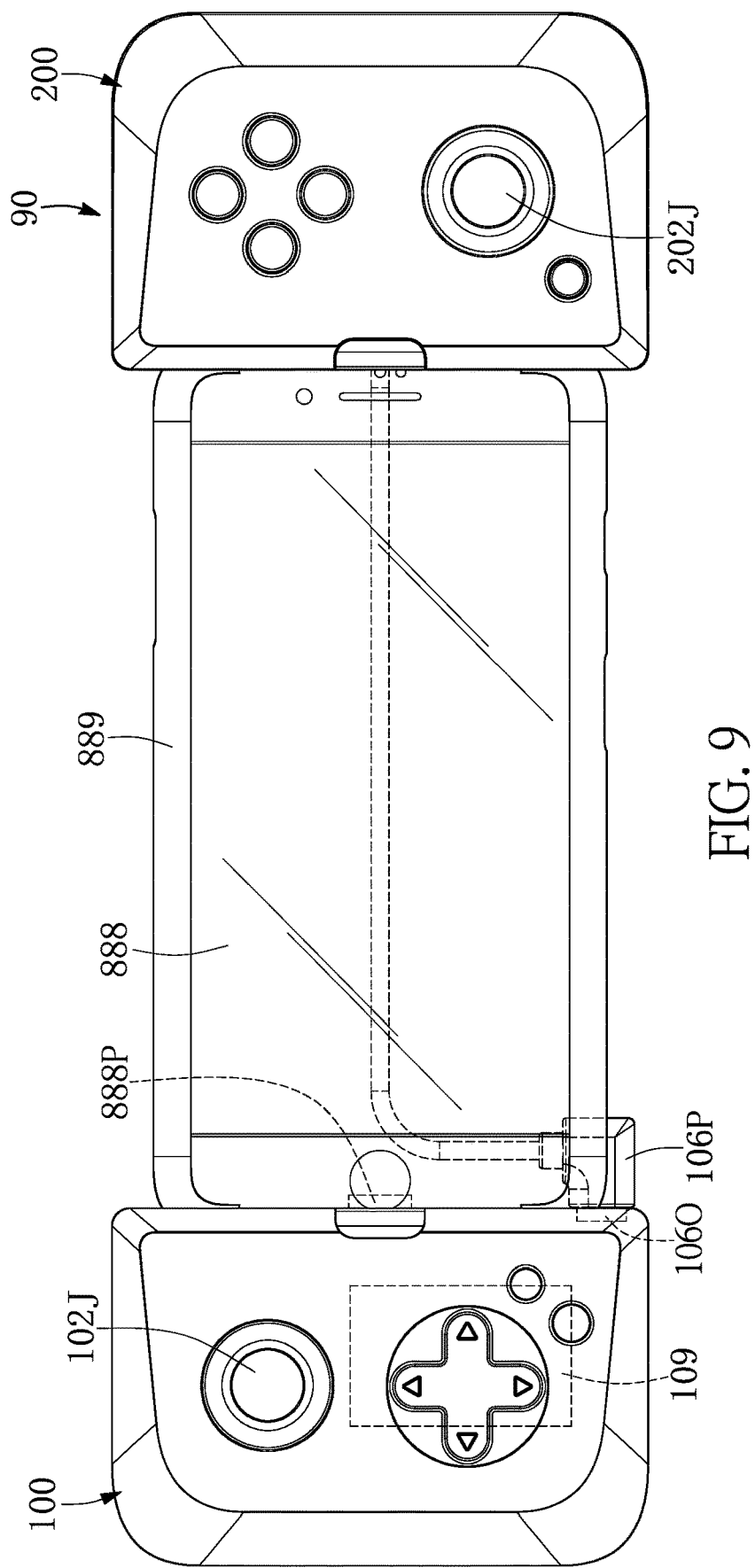
FIG. 9 is a top view showing a mobile device being assembled with two types of single handles that are assembled with each other respectively through a plug connector and a socket connector to form a game controller having two handles in one embodiment of the present disclosure.

Reference is made to FIG. 1, FIG. 4, and FIG. 9. FIG. 9 is a top view of a game controller having two handles in one embodiment of the present disclosure. The first handle 100 and the second handle 200 can be assembled with the mobile device 888, through the second plug connector 106P and the second socket connector 1060 respectively, so as to form a game controller 90 with two handles. Moreover, the protective case 889 is disposed on the mobile device 888.

In one embodiment, the first handle 100 further includes: a first battery module 109. More particularly, the first port 111 is a USB port, and the first battery module 109 is able to transmit power to the mobile device 888 through the first port 111 and a transmission port 888P.

In one embodiment, the second operation interface 202 is one or a combination of the joystick module 202J and a button module. The second operation interface 202 generates a control signal, and then the control signal is transmitted to the transmission port 888P of the mobile device 888 through the third port 233 and the second port 122.

Figure 10:
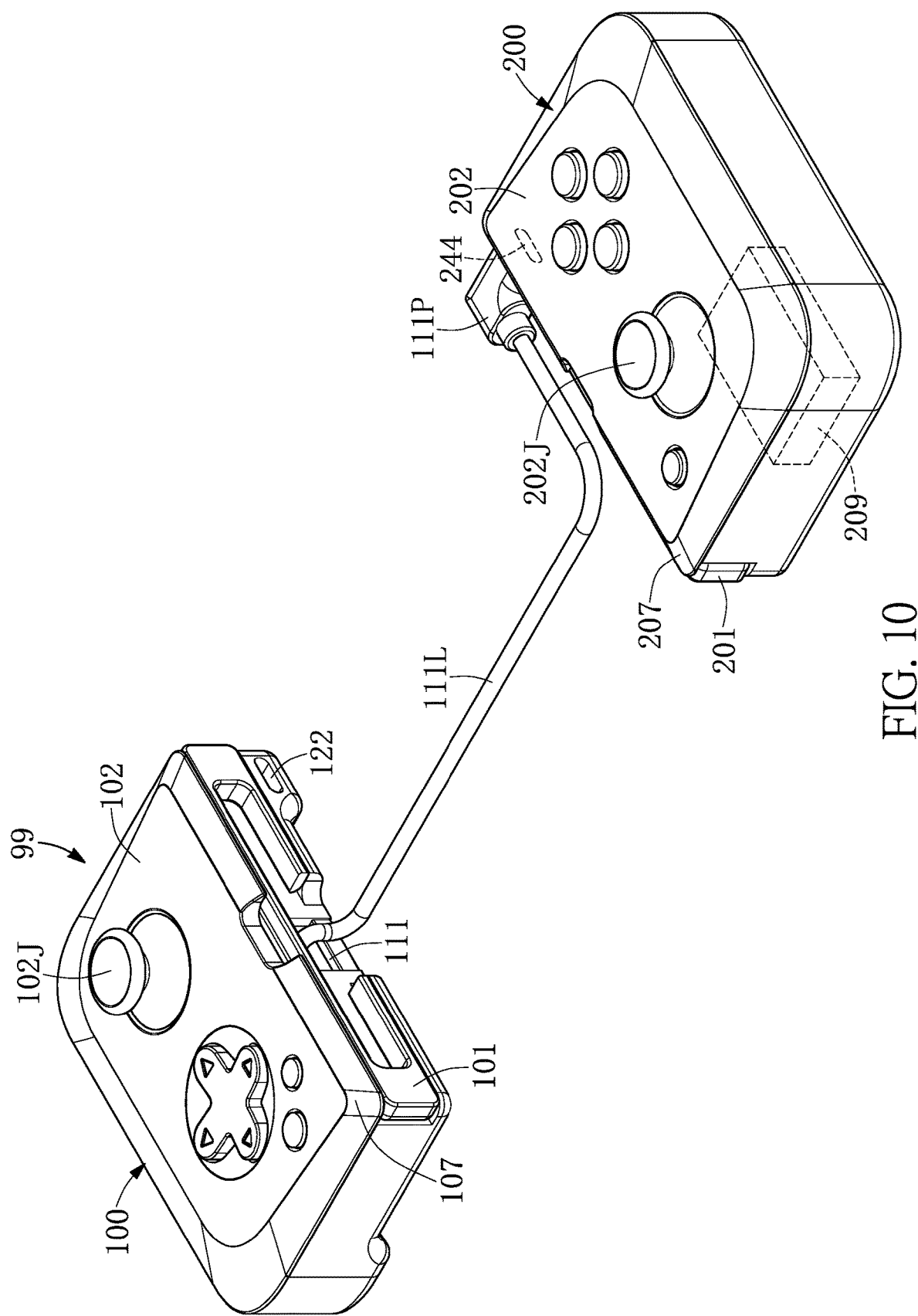
FIG. 10 is a schematic view of two types of single handles of the game controller that are assembled with each other respectively through a socket connector and a plug connector in one embodiment of the present disclosure.

Referring to FIG. 10, a schematic view of two types of the single handles of the game controller that are assembled with each other respectively through a socket connector and a plug connector in one embodiment of the present disclosure is provided. As shown in FIG. 10, a game controller 99 includes the first elastic cushion 101, the first handle 100, the second elastic cushion 201, and the second handle 200. The first handle 100 includes the first port 111, the second port 122, the first affixing part 107, and the first operation interface 102. The first operation interface 102 is electrically connected to the first port 111. The second handle 200 includes the third port 233 and a second battery module 209.

More particularly, the first operation interface 102 is electrically connected to the first port 111, the first affixing part 107 is recessed in the side of the first handle 100, and the first port 111 is disposed on the first affixing part 107.

More particularly, the first elastic cushion 101 is disposed on the first affixing part 107, and the first elastic cushion 101 is sleeved on a mobile device (not shown in the figures), so that the mobile device can be affixed on the first affixing part 107 of the first handle 100 through the first elastic cushion 101.

More particularly, the first port 111 has a first connecting wire 111L and a first plug connector 111P, the second port 122 is electrically connected to the first port 111, and the first connecting wire 111L is connected to the first plug connector 111P.

More particularly, the second battery module 209 is electrically connected to the third port 233, the second affixing part 207 is recessed in the side of the second handle 200, and the third port 233 is disposed on the second affixing part 207.

More particularly, the second elastic cushion 201 is disposed on the second affixing part 207, and the second elastic cushion 201 is sleeved on the mobile device, so that the mobile device is affixed on the second affixing part 207 of the second handle 200 through the second elastic cushion 201. The third port 233 has the second connecting wire (not shown in the figures) and the second plug connector (not shown in the figures), and the second connecting wire is electrically connected to the second plug connector. The third port 233 of the second handle 200 is connected to the second socket connector (not shown in the figures) of the second port 122 of the first handle 100 through the second connecting wire and the second socket connector.

In conclusion, one advantage of the present disclosure is that the game controller, having at least one handle, has a port, a connecting wire, and a plug connector on the side. The connecting wire can be lengthened or shortened so as to be adjusted to suit a position of a transmission port of the mobile device, and the connecting wire can also be stored into an accommodating space of the handle.

When the game controller includes two handles, each of the handles can have a socket connector that enables either one of the handles to be a main device and be connected to mobile devices. The game controller can include two handles, and a port of at least one of the handles has a socket connector that is connected to a plug connector of the port of the other handle, so as to be assembled as a complete game controller.

The mobile device can be assembled with both of the handles or simply a single handle of the game controller, so as to form a complete game controller. The two handles can be used separately, which is suitable for a lighter and more accessible gameplay. The two handles can also be used cooperatively, which is suitable for a more complete gaming experience. Therefore, the detachable game controller can significantly enhance the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, comprising:
a first elastic cushion; and
a first handle including a first port, a first operation interface, and a first affixing part;
a second port disposed on the first handle and being electrically connected to the first port;
a second handle including a third port, a forth port, and a second affixing part;
a second operation interface; and
a second elastic cushion;
wherein the first operation interface is one or a combination of a joystick module or a button module and is electrically connected to the first port, the first affixing part is recessed in a side of the first handle, and the first port is disposed on the first affixing part;
wherein the first elastic cushion is disposed on the first affixing part, and the first elastic cushion is sleeved on a mobile device, so that the mobile device is affixed on the first affixing part of the first handle through the first elastic cushion;
wherein the first affixing part has a first recess and a second recess;
wherein the first port has a first connecting wire and a first plug connector, the first connecting wire is electrically connected to the first plug connector, the second port has a second socket connector, and the first handle has a first accommodating space, such that the first connecting wire is accommodated in the first accommodating space and the first plug connector is exposed out of the first accommodating space and adjacent to the first affixing part;
wherein the second operation interface is electrically connected to the third port, the second affixing part is recessed in a side of the second handle, and the third port is disposed on the second affixing part, the second elastic cushion is disposed on the second affixing part, and the second elastic cushion is sleeved on the mobile device, so that the mobile device is affixed on the second affixing part of the second handle through the second elastic cushion, the third port has a second connecting wire and a second plug connector, the second connecting wire is electrically connected to the second plug connector, and the fourth port having a fourth socket connector is electrically connected to the third port.

2. The game controller according to claim 1, wherein the first port, the second port, the third port, and the fourth port are each one of a micro USB port, a lightning port, and a USB Type-C port.

3. The game controller according to claim 1, wherein the second handle has a second accommodating space, so as to accommodate the second connecting wire.

4. The game controller according to claim 1, wherein the third port of the second handle is connected to the second socket connector of the second port of the first handle through the second connecting wire and the second plug connector.

5. The game controller according to claim 4, wherein the second operation interface is one or a combination of a joystick module and a keyboard module, the second operation interface generates a control signal, and the control signal is transmitted to a transmission port of the mobile device through the third port and the second port.

6. The game controller according to claim 2, wherein the first handle further includes:
a cover, the cover being provided to cover the first accommodating space, so that the first connecting wire is able to be accommodated in the first accommodating space when the cover covers the first accommodating space; and
a first battery module, the first battery module being electrically connected to the first port, and the first battery module transmitting power to the mobile device through the first port.

7. A game controller, comprising:
a first elastic cushion;
a first handle including a first port, a second port, a first affixing part and a first operation interface;
a second elastic cushion; and
a second handle including a third port and a second operation interface;
wherein the first operation interface is electrically connected to the first port, the first affixing part is recessed in a side of the first handle, and the first port is disposed on the first affixing part;
wherein the first elastic cushion is disposed on the first affixing part, and the first elastic cushion is sleeved on a mobile device, so that the mobile device is affixed on the first affixing part of the first handle through the first elastic cushion;
wherein the first port has a first connecting wire and a first plug connector, the second connector is electrically connected to the first port, and the first connecting wire is electrically connected to the first plug connector;
wherein the second operation interface is electrically connected to the third port, the second affixing part is recessed in a side of the second handle, and the third port is disposed on the second affixing part;
wherein the second elastic cushion is disposed on the second affixing part, and the second elastic cushion is sleeved on a mobile device, so that the mobile device is affixed on the second affixing part of the second handle through the second elastic cushion;
wherein the third port has a second connecting wire and a second plug connector and the second connecting wire is electrically connected to the second plug connector;
wherein the third port of the second handle is connected to the second socket connector of the second port of the first handle through the second connecting wire and the second plug connector.

8. A game controller, comprising:
a first elastic cushion;
a first handle including a first port, a second port, a first affixing part, and a first operation interface, the first operation interface being electrically connected to the first port;
a second elastic cushion; and
a second handle including a third port and a battery module;
wherein the first operation interface is electrically connected to the first port, the first affixing part is recessed in a side of the first handle, and the first port is disposed on the first affixing part;
wherein the first elastic cushion is disposed on the first affixing part, and the first elastic cushion is sleeved on a mobile device, so that the mobile device is affixed on the first affixing part of the first handle through the first elastic cushion;

wherein the first port has a first connecting wire and a first plug connector, the second connector is electrically connected to the first port, and the first connecting wire is electrically connected to the first plug connector;

wherein the battery module is electrically connected to the third port, the second affixing part is recessed in a side of the second handle, and the third port is disposed on the second affixing part;

wherein the second elastic cushion is disposed on the second affixing part, and the second elastic cushion is sleeved on a mobile device, so that the mobile device is affixed on the second affixing part of the second handle through the second elastic cushion;

wherein the third port has a second connecting wire and a second plug connector and the second connecting wire is electrically connected to the second plug connector;

wherein the third port of the second handle is connected to the second socket connector of the second port of the first handle through the second connecting wire and the second plug connector.

* * * * *